M. C. SCHWEINERT AND H. P. KRAFT.
PRESSURE GAGE FOR PNEUMATIC TIRES OR THE LIKE.
APPLICATION FILED DEC. 16, 1916.
1,379,220.
Patented May 24, 1921.
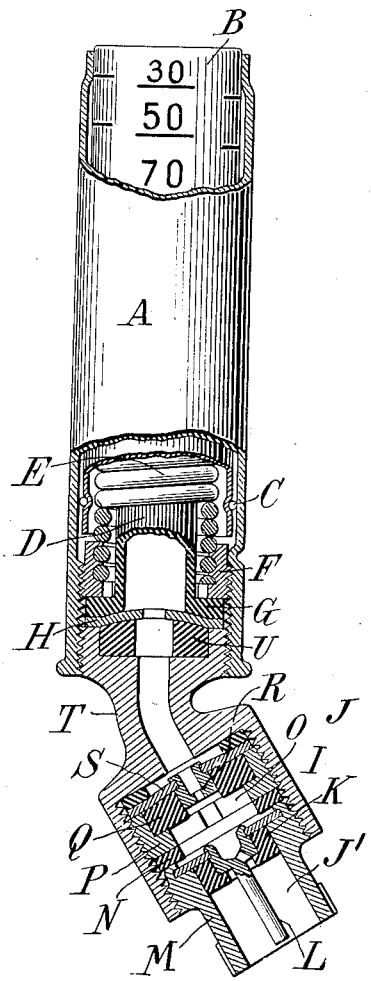
WITNESSES:
INVENTOR :
Maximilian Charles Schweinert
and Henry Phillip Kraft
By Attorneys,

UNITED STATES PATENT OFFICE.

MAXIMILIAN CHARLES SCHWEINERT, OF WEST HOBOKEN, AND HENRY PHILLIP KRAFT, OF RIDGEWOOD, NEW JERSEY.

PRESSURE-GAGE FOR PNEUMATIC TIRES OR THE LIKE.

1,379,220.  Specification of Letters Patent.  Patented May 24, 1921.

Application filed December 16, 1916. Serial No. 137,326.

*To all whom it may concern:*

Be it known that we, MAXIMILIAN CHARLES SCHWEINERT and HENRY P. KRAFT, citizens of the United States of America, residing in West Hoboken, in the county of Hudson and State of New Jersey, and Ridgewood, in the county of Bergen and State of New Jersey, respectively, have invented certain new and useful Improvements in Pressure-Gages for Pneumatic Tires or the like, of which the following is a specification.

This invention relates to pressure gages for pneumatic tires or the like and aims to provide certain improvements therein. The best types of tire pressure gages now on the market are of the straight line variety, that is to say, the deflating foot which fits onto the tire valve and presses down the valve pin of the latter, has been mounted in axial alinement with the casing and the piston or its equivalent which indicates the pressure has been mounted to slide within the casing in axial alinement with the foot. This construction provides a simple and compact structure which is easily carried in the pocket and easily applied to the valve. In some types of wire wheels, however, the spokes are so close together as to leave insufficient room for the application of the gage to the valve, particularly when the gage bar or its equivalent is extended beyond the top of the casing. This is also true with certain types of wooden wheels.

According to the present invention we provide a gage in which the main casing is connected to the deflating foot by a neck member which is in effect bent out of axial alinement with the casing, so that when the foot is applied to the valve, the casing will extend in a sufficiently angular relation to the plane of the wheel to bring it and its indicating member outside of the wheel spokes, so that the latter do not interfere with the proper application of the gage. The invention also includes certain other improvements which will be hereinafter more fully described.

Referring to the accompanying drawing which illustrates the preferred form of the invention,—

The figure is a view of the gage complete illustrating certain parts in diametrical section and other parts in elevation.

In the drawing we have shown the invention as applied to the well known Schrader type of gage which comprises a casing A, through the upper end of which is adapted to extend an indicating sleeve B, having a friction ring C at its lower end by means of which the sleeve is frictionally held in the varying positions to which it is moved by the pressure. Movement is imparted to the indicating sleeve by the extension of a rubber sleeve D, the upper end of which bears against a sliding plug or head (not shown), which in turn engages the under side or the top of the indicating sleeve. This plug or head is connected to the gage case by a loading spring E, so that the head is retracted after the gage is removed from the valve, while the indicating sleeve retains its indicating position. In the usual construction shown the spring is connected to the casing by a plug F, and the foot G of the rubber sleeve D is squeezed against the plug by a disk H.

The deflating foot is indicated as a whole by the letter J, and in the construction shown, is dual in its function: that is to say, it is capable of making an air-tight joint with either the foreign or domestic type of valve. When the gage is in the condition illustrated it is adapted to be used in connection with a foreign type of valve, the lower part of the foot having a deep recess J' which is adapted to receive the top of the valve, and a packing K adapted to be pressed against the upper end of the valve and make a tight joint therewith. A long deflating pin L is provided which extends within the upper part of the valve and contacts with the valve pin, thereby unseating the check of the valve. These parts are carried in a detachable sleeve M, and when it is desired to use the gage on an American valve the sleeve M is removed (preferably also the packing ring N), whereupon the device is adapted for use in connection with an American valve. In such use the top of the valve extends within a recess O formed in a collar P, the upper end of the valve contacting with a packing Q, and the valve pin being depressed by an abutment R carried on a disk S.

In gages intended solely for American valves, the parts P, Q, R and S are screwed directly in the lower part of the casing A (the disk H in this case being omitted).

From the standpoint of manufacture, it is desirable to produce the gage of the present invention with as little change as possible from the standard practice, in order that as many parts as possible may be used in either type of gage.

To this end, according to the present invention, a member T is provided which is added to the usual casing A preferably by screwing it in to the bottom of the casing as shown. A packing, such as U, is preferably introduced so as to make a tight joint between the top of the member T and the disk H.

The lower part of the member T is formed with a recess which is capable of receiving either the American type of deflator or the foreign type, or (as shown in the accompanying drawing) both types may be inserted in the member T so that the gage may be interchangeably used in connection with either valve. In the construction shown the foreign foot may as before stated be removed if the American valve is to be tested.

According to the present invention the foot of the member T instead of being in axial alinement with the gage casing A is displaced angularly to a sufficient extent so that when the gage is applied to a valve, the gage casing will extend out of the plane of the wheel, so that it will not contact with the spokes or hub. This displacement should not be greater than necessary since it is desirable to keep the gage as nearly as possible in a straight line so that it will be easily carried and manipulated. From the manufacturing standpoint this is a construction which involves difficulties and it has been found that the best way to secure the result is to provide the member T with a neck of reduced dimensions which lies between its upper flange and its foot and bend the member at the neck to the required degree of angularity.

By the present invention we not only provide a gage which is capable of operation under conditions in which the ordinary gage is used, but we construct it in such manner that the standard form of gage can be utilized with practically no change except the addition of the member T.

While we have shown and described the preferred form of the invention it will be understood that we do not wish to be limited thereto since various changes may be made therein without departing from the spirit of the invention.

What we claim is:—

1. A gage for pneumatic tires or the like comprising a casing, a foot member T provided with means for connection with a tire valve casing, said foot member having a reduced neck between said casing and connection means, said neck being readily bendable, whereby in the manufacture of said gage said foot can be bent to a desired angle with relation to said casing, and whereby the desired angle may be changed by the degree of bending to which the neck is subjected.

2. A gage for pneumatic tires or the like comprising a casing, a foot member T provided with means for connection with a tire valve casing, said foot member being of solid metal and having a reduced neck between said casing and connection means, said neck being readily bendable, whereby in the manufacture of said gage said foot can be bent to a desired angle with relation to said casing, and whereby the desired angle may be changed by the degree of bending to which the neck is subjected.

3. A gage for pneumatic tires or the like comprising a casing, a foot member T provided with means for connection with a tire valve casing, said foot member having a single short integral reduced neck between said casing and connection means, said neck being readily bendable, whereby in the manufacture of said gage said foot can be bent to a desired angle with relation to said casing, and whereby the desired angle may be changed by the degree of bending to which the neck is subjected.

4. A gage for pneumatic tires or the like comprising a casing, an indicating member adapted to reciprocate therein, a supplemental foot portion adapted to be connected with said casing, said supplemental portion having a screw-threaded recess adapted to engage two deflating devices one above the other, and two such deflating devices in said screw-threaded recess.

5. A gage for pneumatic tires or the like comprising a casing, an indicating member adapted to reciprocate therein, a supplemental foot portion adapted to be connected with said casing, said supplemental portion having a screw-threaded recess adapted to engage two deflating devices one above the other, and said supplemental foot portion being bent between its ends to bring its lower end into angular relation to the gage casing.

In witness whereof, we have hereunto signed our names.

MAXIMILIAN CHARLES SCHWEINERT.
HENRY PHILLIP KRAFT.